United States Patent [19]
Meyers et al.

[11] 3,935,661
[45] Feb. 3, 1976

[54] PORTABLE RODENT EXTERMINATOR

[76] Inventors: Daniel B. Meyers, 164 Rome St., San Francisco, Calif. 94112; Gary C. Yerby, 78 Lausanne St., No. 2, Daly City, Calif. 94104

[22] Filed: Nov. 20, 1974

[21] Appl. No.: 525,658

[52] U.S. Cl. ............................................. 43/60
[51] Int. Cl.² .................................... A01M 23/02
[58] Field of Search ........................ 43/60, 61, 69

[56] References Cited
UNITED STATES PATENTS
| | | | |
|---|---|---|---|
| 1,286,601 | 12/1918 | Haege | 43/69 |
| 1,790,575 | 1/1931 | Csontos | 43/60 |
| 3,733,735 | 5/1973 | Hirsch | 43/61 |

FOREIGN PATENTS OR APPLICATIONS
| | | | |
|---|---|---|---|
| 113,362 | 1/1900 | Germany | 43/55 |

*Primary Examiner*—Louis G. Mancene
*Assistant Examiner*—Daniel J. Leach

[57] ABSTRACT

A portable rodent exterminator for transporting and/or exterminating rodents collected in container-type traps designed to couple to the exterminator during transfer, the exterminator is comprised of a container having a removable top, a retractable divider plate, a storage chamber below the divider plate, and a viewing window in the side of the container for viewing the transfer and extermination process.

6 Claims, 5 Drawing Figures

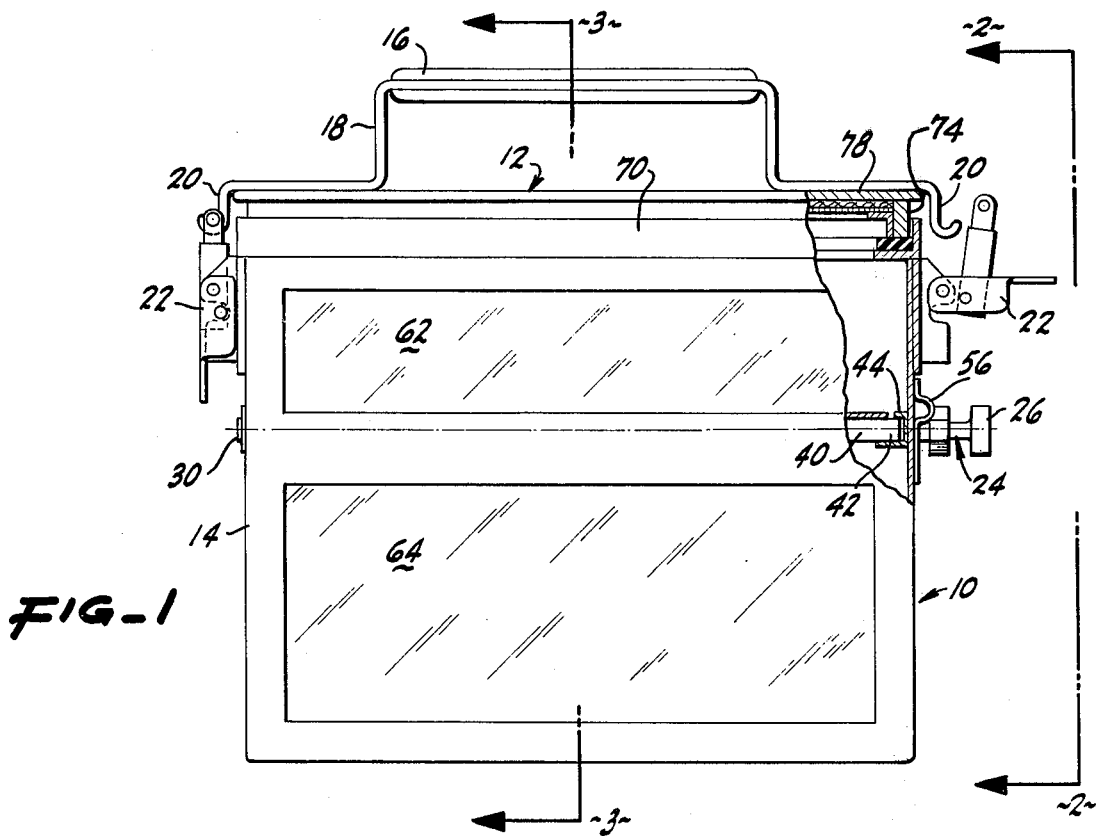
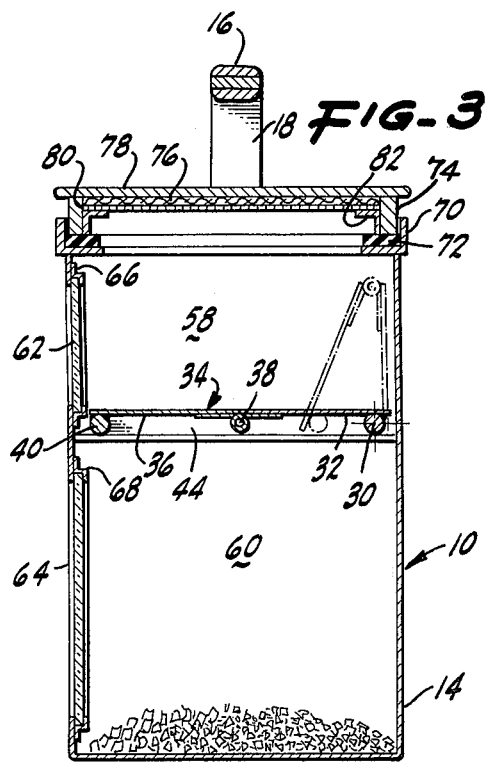
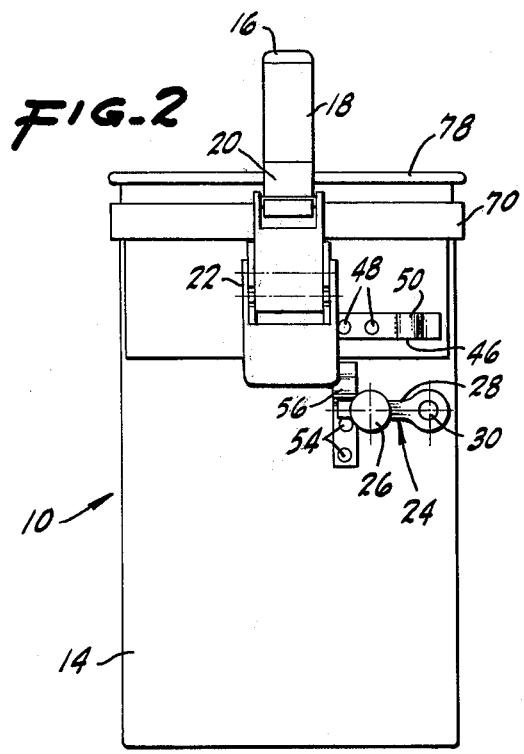

3,935,661

PORTABLE RODENT EXTERMINATOR

BACKGROUND AND SUMMARY OF THE INVENTION

Certain rodent traps capture rather than kill rodents such as mice, rats, and the like. From these traps, the rodents must be transferred for extermination and disposal. In conventional transfer methods, the rodents are generally dumped into a collection container for transport and subsequent extermination, thus permitting the trap to be immediately reset. During such transfers, rodents sometimes escape requiring the recapture of a somewhat wiser animal.

To eliminate the possibility of escape, a portable exterminator has been devised which is designed to couple to certain types of animal traps, such as those described in our patent application entitled "RODENT TRAP," filed on Nov. 20, 1974.

The portable exterminator is designed to collect for transport and, if desired, exterminate collected rodents from numerous traps. The collected rodents can be subsequently disposed of according to accepted health regulations.

The exterminator comprises a box-like container having a removable top. The box-like container includes a horizontal divider plate that, when in position, defines upper and lower chambers. The divider plate is retractable, allowing rodents dropped through the open top of the container to fall to the lower chamber when the divider plate is retracted.

The box-like container has, at the top, a flat inset rim with a peripheral seal which hermetically seals the container when the removable top is latched to the container. The underside of the top is constructed with a porous material which may be impregnated with a vapor-producing liquid for asphyxiating or anesthetizing rodents collected in the hermetically sealed container.

The flat inset rim is further designed as a peripheral seat for the rim of a container-type trap, allowing the trap to be temporarily coupled to the exterminator during transfer of rodents from the trap to the exterminator.

A viewing window in one side of the exterminator allows the inside chambers to be viewed during the transfer and extermination process. These and other features will be apparent from the following description of the preferred embodiment.

BRIEF DESCRIPTION OF THE DRAWINGS

FIG. 1 is a front elevational view, partially fragmented, of the exterminator.

FIG. 2 is an end elevational view taken on the lines 2—2 in FIG. 1.

FIG. 3 is a cross-sectional view taken on the lines 3—3 in FIG. 1.

DETAILED DESCRIPTION OF THE PREFERRED EMBODIMENT

Figures 4, 5:
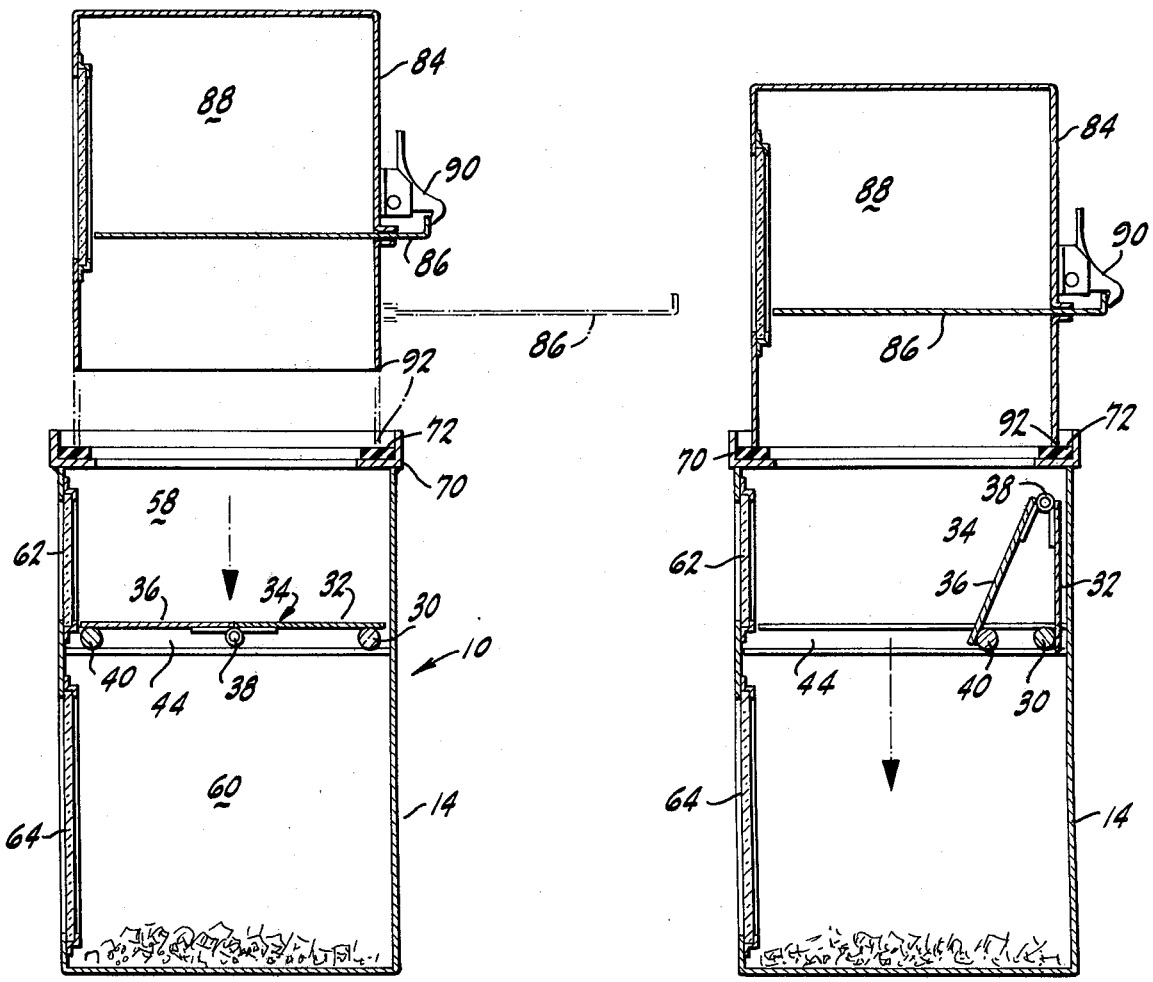
FIG. 4 is a cross-sectional view of the exterminator and an animal trap container schematically arranged above the exterminator.
FIG. 5 is a cross-sectional view of the exterminator and an animal trap container coupled to the exterminator.

Referring to FIG. 1, the exterminator, designated generally by the reference numeral 10, is shown with a top cover 12 coupled and partially latched to a box-like container 14. The top cover 12 includes a handle 16 for conveniently transporting the exterminator. The handle 16 is formed with a bracket 18 attached to the top surface of the cover. The bracket has two projecting elements 20 at each end of the cover 12, which are engageable by snap latches 22 mounted to the top sides of the container 14. One of the latches 22 is shown disengaged to illustrate the general operational nature of the conventional latch. The arrangement of the handle 16 and latch is also illustrated in FIG. 2.

On one side of the box-like container 14 is mounted a crank 24 which, as shown in FIG. 2, includes a knob 26 at the end of a crank arm 28 that is rigidly connected to a shaft 30 running through the container 14. The connected shaft 30 is, in turn, connected to the end of a first leaf 32 of a hinged divider plate 34, as shown in FIG. 3. Referring to FIG. 3, a second leaf 36 is connected to the first leaf 32 by an elongated hinge 38. At the distal edge of the second leaf 36 is fixedly attached a guide rod 40 which has ends 42 which project beyond the side edges of the second leaf and are slidably engaged in a pair of guide tracks 44 mounted to the inside walls of the container, as shown by the exemplar in the fragmented portion in FIG. 1. When the crank 24 is turned, the divider plate is folded by action of the pivoted first leaf 32 and the guide rod, which tracks in the guide tracks 44, as schematically illustrated in phantom in FIG. 3.

To retain the crank 24 in a position with the divider plate 34 retracted, a leaf spring stop 46 is fastened by rivets 48 at one end to the container. The crank arm 28 rides over a deformable projection 50 in the spring stop 46 and is retained by the projection 50 from unassisted return. Similarly, a second leaf spring stop 52, fastened by rivets 54, has a deformable projection 56, shown also in FIG. 1, for retaining the crank 24 in a position in which the divider plate 34 divides the container 14 into an upper chamber 58 and a lower chamber 60. When so positioned, the lower chamber is enclosed, though not hermetically sealed, from the remainder of the container, thus preventing escape of rodents in the lower chamber while the cover is removed.

The container 14, as shown in FIGS. 1 and 3, includes an upper window 62 and a lower window 64 for viewing the upper chamber 58 and lower chamber 60, respectively, particularly during transfer of rodents from a trap to the exterminator. The windows 62 and 64 are constructed from a safety glass or plastic and are encased in metal frames 66 and 68, as shown in FIG. 3.

Around the top of the container 14 is a L-shaped, peripheral flange 70 having a deformable peripheral sealing gasket 72. A depending rim 74 on the top cover 12 locates within the vertical leg of the L-shaped flange and seats on the sealing gasket 72, thereby providing the hermetic seal between the cover 12 and the container 14.

The underside of the top cover 12 includes an absorbent material layer 76 retained in place against an impervious top cover plate 78 by a screen 80 and a peripheral frame 82, as shown in the cross-sectional view of FIG. 3. The absorbent material can be partially soaked with a liquid, such as acetone or chloroform, to asphyxiate or anesthetize collected rodents before disposal; for example, by cremating.

Referring now to FIGS. 4 and 5, the manner of transferring rodents from a container-type trap to the exterminator is shown. In FIG. 4, a container, designated generally by the reference numeral 84, of a container-type trap, such as described by the above-referenced application, is inverted with the open end downward and oriented above the exterminator. A horizontal divider plate 86 maintains captured rodents in an enclosed compartment 88 in the trap container. A finger latch 90 engages the edge of the divider plate 86 and prevents accidental, premature opening. The trap container is then coupled to the exterminator by seating the peripheral open edge 92 of the container against the deformable sealing gasket 72 on the flange 70 of the exterminator, as shown in phantom in FIG. 4. The divider plate 86 in the trap container 84 is then withdrawn, as again shown in phantom in FIG. 4. As indicated by the illustrative arrow, captured rodents in the trap container drop to the upper chamber 58 above the hinged divider plate 34 in the exterminator.

Referring to FIG. 5, the hinged divider plate 34 is then rapidly folded to drop the captured rodents to the lower collection chamber 60 in the exterminator. Before the trap container 84 is removed from the exterminator, the hinged divider plate 34 is returned to its expanded horizontal position, encaging the collected rodents in the lower chamber 60. Once the hinged divider plate 34 is in place, the trap container 84 is removed and the top cover replaced, as shown in FIG. 3.

Captured rodents can be destroyed after collection by means other than the use of vapors. For example, poisoned bait in the lower chamber or simple suffocation in the sealed exterminator will exterminate the rodents before removal for disposal. Alternately, the exterminator may be used as a simple collector with final extermination done elsewhere at a central collection center using a reverse transfer process from the exterminator container to another container.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A portable rodent exterminator comprising: a container having an enclosable inside chamber and an open top, a top cover, coupling means on said open top of said container for mounting said top cover on said container, said coupling means being further adapted to couple an open end of a rodent trap container to said container, said coupling means having further sealing means on said open top of said container for hermetically sealing said top cover and said container, said sealing means being adapted to provide a substantially sealed coupling seating when said container is coupled to the open end of a rodent trap container, cooperating means on said top cover and said container for releasably attaching said top cover to said container, a divider plate positionable within said container, and, means for reversibly displacing said divider plate across said inside chamber selectively forming an enclosed inside chamber and an open inside chamber.

2. The portable rodent exterminator of claim 1 wherein said mounting means on said open top of said container comprises a flange having a raised peripheral rim and said sealing means comprises a deformable peripheral sealing gasket.

3. The portable rodent exterminator of claim 1 wherein said means for releasably attaching said top cover to said container comprises a plurality of latches on said container and a plurality of cooperating latch-engageable elements on said top cover.

4. A portable rodent exterminator comprising: a container having an enclosable inside chamber and an open top, a top cover, means on said open top of said container for mounting said top cover on said container, said means being further adapted to couple an open end of a rodent trap container to said container, cooperating means on said top cover and said container for releasably attaching said top cover to said container, a divider plate positionable within said container, and, means for reversibly displacing said divider plate across said inside chamber selectively forming an enclosed inside chamber and an open inside chamber wherein said means for reversibly displacing said divider plate across said inside chamber comprises a shaft pivotally mounted within said chamber, said shaft having an extension projecting through said chamber, an external crank connected to the end of said shaft, a rod slidably mounted within said chamber, guide means fixed within said chamber, said rod having ends slidably engageable with said guide means, wherein said divider plate has a first leaf, a second leaf and a hinge connecting said first and second leaves along a first edge of each leaf, said first leaf having a second edge connected to said shaft, and said second leaf having a second edge connected to said rod, wherein said divider plate is retracted and folded when said crank is rotated in one direction and displaced across said chamber when said crank is rotated in an opposite direction.

5. The portable rodent exterminator of claim 1 wherein said top cover includes an underside having a liquid absorbent material adapted to absorb a vapor-producing liquid for asphyxiating collected rodents.

6. The portable rodent exterminator of claim 1 wherein said container includes at least one viewing window.

* * * * *